(12) United States Patent
Lu et al.

(10) Patent No.: US 8,005,264 B2
(45) Date of Patent: Aug. 23, 2011

(54) METHOD OF AUTOMATICALLY DETECTING AND TRACKING SUCCESSIVE FRAMES IN A REGION OF INTERESTING BY AN ELECTRONIC IMAGING DEVICE

(75) Inventors: Sheng-Min Lu, Hangzhou (CN); Rong Zhang, Hangzhou (CN); Jin Wang, Hangzhou (CN)

(73) Assignee: Arcsoft, Inc., Fremont, CA (US)

( * ) Notice: Subject to any disclaimer, the term of this patent is extended or adjusted under 35 U.S.C. 154(b) by 632 days.

(21) Appl. No.: 12/155,690

(22) Filed: Jun. 9, 2008

(65) Prior Publication Data

US 2009/0304231 A1   Dec. 10, 2009

(51) Int. Cl.
*G06K 9/00* (2006.01)
*H04N 5/225* (2006.01)
(52) U.S. Cl. ........................................ 382/103; 348/169
(58) Field of Classification Search .................. 382/103, 382/107, 236, 240; 348/94, 154, 155, 169, 348/170, 171, 172, 208.1, 208.2, 208.14, 348/208.16, 347, 352, 356; 342/95, 96
See application file for complete search history.

(56) References Cited

U.S. PATENT DOCUMENTS 5,572,596 A * 11/1996 Wildes et al. ................. 382/117
6,850,249 B1 * 2/2005 Gu ................................ 345/623

* cited by examiner

*Primary Examiner* — Abolfazl Tabatabai
(74) *Attorney, Agent, or Firm* — Bacon & Thomas, PLLC

(57) ABSTRACT

A method of automatically detecting and tracking successive frames in a region of interesting by an electronic imaging device includes: decomposing a frame into intensity, color and direction features according to human perceptions; filtering an input image by a Gaussian pyramid to obtain levels of pyramid representations by down sampling; calculating the features of pyramid representations; using a linear center-surround operator similar to a biological perception to expedite the calculation of a mean value of the peripheral region; using the difference of each feature between a small central region and the peripheral region as a measured value; overlaying the pyramid feature maps to obtain a conspicuity map and unify the conspicuity maps of the three features; obtaining a saliency map of the frames by linear combination; and using the saliency map for a segmentation to mark an interesting region of a frame in the large region of the conspicuity maps.

22 Claims, 8 Drawing Sheets

METHOD OF AUTOMATICALLY DETECTING AND TRACKING SUCCESSIVE FRAMES IN A REGION OF INTERESTING BY AN ELECTRONIC IMAGING DEVICE

FIELD OF THE INVENTION

The present invention relates to a method of detecting and tracking successive frames, and more particularly to a method of automatically detecting and tracking successive frames in a region of interesting by an electronic imaging device which decomposes a frame into three features corresponding to the intensity, color and direction according to the human vision principle for perceptions of intensity, color and orientation, uses a down sampling method to obtain the conspicuity map of each feature, uses a linear combination method to obtain a saliency map of the frames, and then uses the saliency map for performing a segmentation to mark an interesting region in a frame at the large region of the mean value of the conspicuity maps.

BACKGROUND OF THE INVENTION

In recent years, digital imaging technology develops rapidly, and various digital imaging components (such as CCD and CMOS, etc) and electronic imaging devices (such as digital camera, digital camcorders, notebook computers, mobile phones and webcams, etc) are introduced to the market continuously, not only the imaging quality becomes increasingly higher, but the size of the products also becomes increasingly smaller, and the market price drops drastically, and thus these products become more popular. In addition to the function for consumers to take pictures of people and sceneries by using the electronic imaging devices, images can also be stored into a computer, so that consumers can view the pictures anytime. In general, manufacturers also use these electronic imaging devices to operate with an image tracking system for identifying, positioning and tracking one or more specific targets in a series of video frames in order to achieve certain industrial functions and purposes as listed below:

(1) In the area of electronic manufacturing, the aforementioned devices and system are primarily used for guiding robots to perform the tasks of positioning high-precision PCB and mounting SMT components.

(2) In the area of mechanical manufacturing, the aforementioned devices and system are primarily used for identifying components, inspecting quality at a production line, and enhancing the production and yield rate by feedback control.

(3) In the area of the military and national defense industry, the aforementioned devices and system are primarily applied in weapon navigation such as using a weapon system to identify and tracking several moving targets.

(4) In the area of the security industry, the aforementioned devices and system are primarily applied for automatic surveillance for monitoring the situation in the streets, malls, banks or communities, and even providing an intelligent security system for residences when a house owner leaves the house.

(5) In the area of the traffic industry, the aforementioned devices and system are primarily applied for testing and tracking motor vehicles, automatically monitoring violations of motor vehicles and recording the violations.

(6) In the area of sports and matches, the aforementioned devices and system are primarily applied for automatically analyzing the statistics of athletes.

(7) In the area of scientific research, these electronic imaging devices are primarily applied for analyzing animal behaviors and observing motions of a specific object in an experiment.

(8) In the area of the television broadcasting, the aforementioned devices and system are primarily used for continuously shooting a specific target.

(9) In the area of the electronic imaging device, the aforementioned devices and system are primarily used in electronic imaging devices such as digital cameras, digital camcorders and PC cams for detecting and tracking an interesting region of an image automatically, and achieving an automatic adjustment such as an auto focus, an auto exposure and an auto white-balance for assisting beginners to take or shoot continuous images of herself/himself or a specific person/object. Particularly for the use in a chat via a webcam, the webcam can be aimed at the chatters.

In summation of the description above, the electronic imaging device is low-price and fine, and thus becoming increasingly popular. The image tracking system and technology is developed in a fast phase accordingly, in hope of effectively extending the application scope and utility of the electronic imaging devices.

At present, various image tracking systems and software are introduced to the market, and the image tracking algorithm generally computes, positions and tracks feature points of the captured successive frames based on the similarity of mean absolute errors. However, the algorithm for the feature points is too complicated or unable to effectively to improve the significance of the feature points, or unable to achieve the effectiveness of similarity measurement, so that the image tracking systems and software cannot achieve the real-time delivery and precision of an image tracking processing due to a poor robustness of the image tracking algorithm when the background of the images is too complicated. Therefore, it is an important research and development subject for designers manufacturers of electronic imaging devices to find a way of designing an image tracking algorithm with an intelligent tracking function, such that the electronic imaging device can detect and track interesting regions in successive frames automatically in the condition of a too-complicated background of the images, and the image tracking algorithm still has the best robustness to achieve the real-time delivery and precision of the image tracking processing.

SUMMARY OF THE INVENTION

In view of the shortcomings of the prior art, the inventor of the present invention based on years of experience in the related industry to conduct extensive researches and experiments, and finally developed a method of automatically detecting and tracking successive frames in a region of interesting by an electronic imaging device in accordance with the present invention to overcome the aforementioned shortcomings and effectively detect and track an interesting region of successive frames.

It is a primary objective of the present invention to provide a method of automatically detecting and tracking successive frames in a region of interesting by an electronic imaging device, and the method decomposes a frame into three features corresponding to the intensity, color and direction according to the human vision principle for perceptions of intensity, color and orientation. Since the visual significance of an image in a region relates to the resolution of the image, therefore the present invention adopts a Gaussian pyramid to filter an input image and uses a down sampling method to obtain a plurality of levels of pyramid representations, and each level of pyramid representations are images of the input image at different resolutions, and calculates the aforementioned features of each level of pyramid representations. When each feature is calculated, a linear center-surround operator similar to a biological perception is used for an integral image to expedite the calculation of a mean value of the peripheral region, and the difference of each feature between the small central region and the peripheral region is used as the measured value of the feature of the resolution, and then the pyramid feature map calculated by each feature is overlaid by a down sampling method to obtain the conspicuity map of each feature, and perform a unification for the conspicuity maps of the three features, and then a linear combination method is used for obtaining a saliency map of the frames, and finally the saliency map is used for performing a segmentation to mark an interesting region in a frame at the large region of the mean value of the conspicuity maps.

Another objective of the present invention is to provide a method based on an image tracking algorithm of an interesting region of a feature point similarity, and a region of interesting detection (ROID) module is used to obtain an interesting region in a reference map, and obtain a feature point in the region as a basis for the tracking, and the integral image is used to create a similarity measurement formula that maintains the details of the interesting region, so as to overcome the shortcoming of the traditional image tracking algorithm based on the similarity of the mean absolute errors. In addition to the effective improvement of the capability of identifying a similar gray-scale distribution, the present invention also overcomes the interference caused by the variation of dimensions and rotation of an interesting region, and experiments show that the image tracking algorithm of the invention can still greatly improve the significance of feature points and the effectiveness of similarity measurements to provide higher computing speed and robustness even in the situations of a complicated background.

To make it easier for our examiner to understand the objective, technical characteristics and effects of the present invention, preferred embodiments will be described with accompanying drawings as follows.

DETAILED DESCRIPTION OF THE PREFERRED EMBODIMENTS

From the view point of a human visual system, human being's attention on the texture in each region of a frame has a time sequence. If each region defines a measurement standard, then the larger the measured value, the higher is the visual significance of the region. It implies that a viewer sensitively pays more attentions to a certain specific region than other regions, and a region with a larger measured value can attract a viewer's attention better. Therefore, the region of interesting (ROI) mentioned in the present invention refers to a region in a frame that can attract more attention of a viewer.

In general, a region in a frame that can better attract a viewer's attention (which is a region having a larger visual significance) generally relates to factors such as its dimensions, shape, motion method, texture, color, contrast, and color visual perception difference of human eyes. The present invention eliminates the influence of these factors to human visual perception, and decomposes the image into three feature spaces such as intensity, color and orientation according to the human vision for the perception of intensity, color and orientation. An image I is used as an example for an illustration to describe the decomposition and calculation of feature points as follows:

Since the components of three color (red, green and blue) channels of the image I are r, g, b respectively, therefore the image can be decomposed into three features such as intensity, color and orientation according to the following formula:

(1) Intensity Feature: The present invention uses the following formula of the gray scale map to calculate the intensity feature of the input image:

$$I=(r+g+b)/3 \qquad (1\text{-}1)$$

(2) Color Feature: The present invention uses the following formula to calculate the color information of four channels R, G, B, Y from the three channels r, g, b according to the principle of human vision for the color sensitivity:

$$R=r-(g+b)/2 \qquad (1\text{-}2)$$

$$G=g-(r+b)/2 \qquad (1\text{-}3)$$

$$B=b-(r+g)/2 \qquad (1\text{-}4)$$

$$Y=(r+g)/2-|r-g|-b \qquad (1\text{-}5)$$

(3) Orientation Feature: The present invention uses a Gabor pyramid, and a Gabor filter in four directions (0°, 45°, 90° and 135°) to perform a convolution filter for the intensity image to obtain the feature maps of the four directions.

Figure 1:
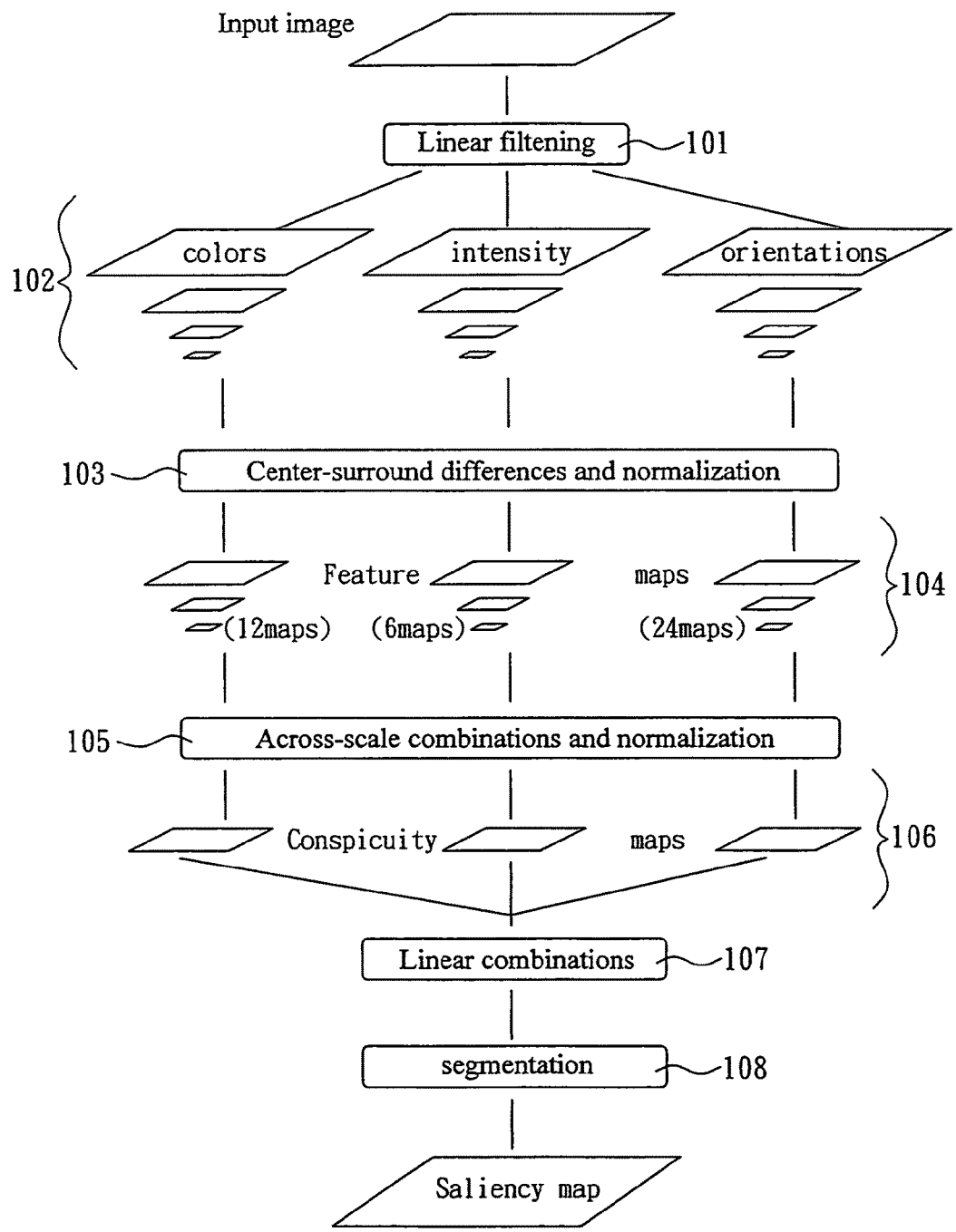
FIG. 1 is a flow chart decomposing an input image according to each feature and calculating a conspicuity map corresponding to each feature by using the Gaussian pyramid computation in accordance with a preferred embodiment of the present invention.
Figure 2:
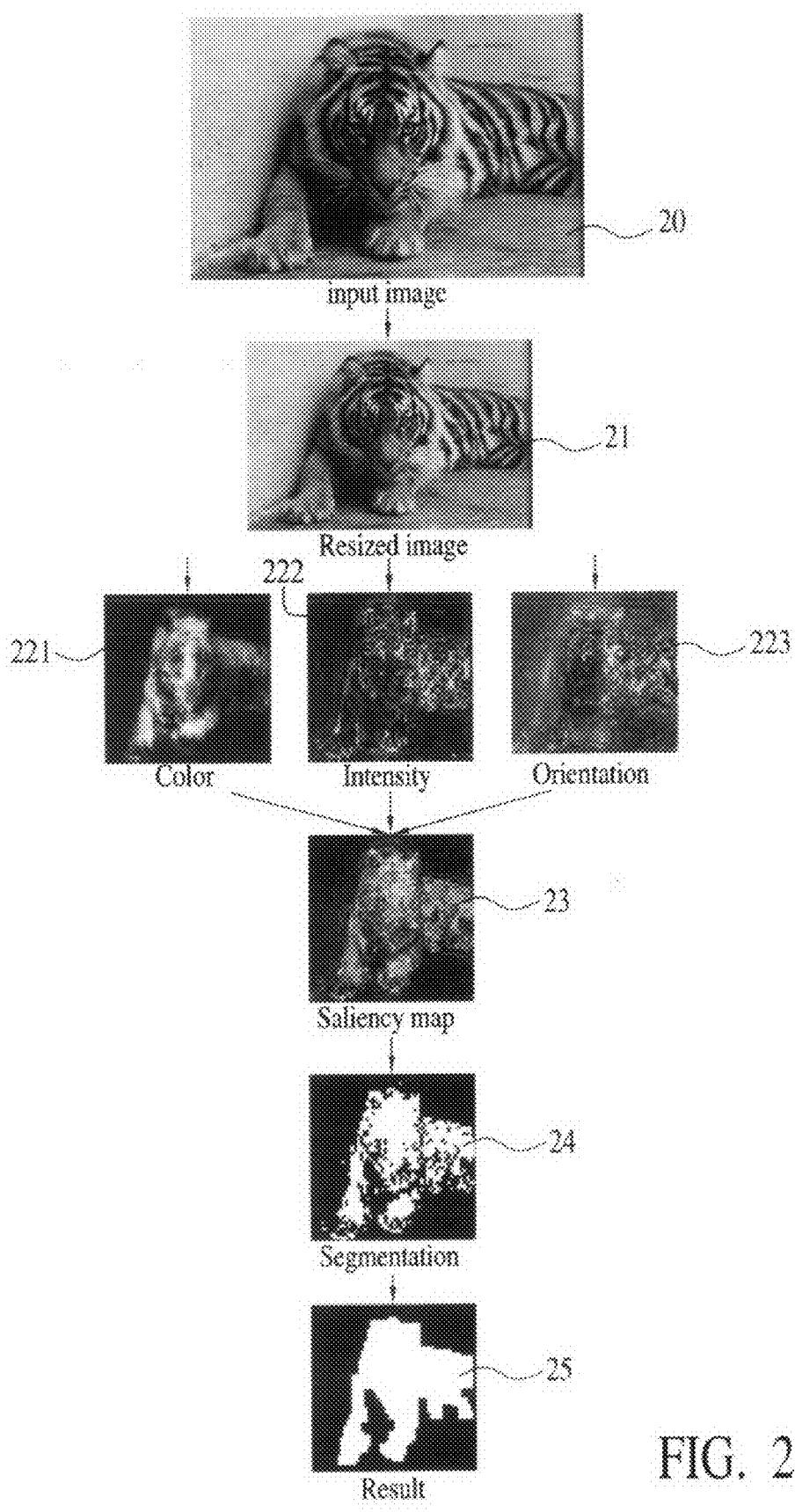
FIG. 2 is a schematic view of using an input image as an example for illustrating an image produced by a flow chart as depicted in FIG. 1.

Since the visual significance of the region is related to the resolution of the image, therefore a preferred embodiment of the present invention adopts a Gaussian pyramid computation to calculate a corresponding conspicuity map of each feature according to an input image decomposed by each feature, and its procedure as shown in FIG. 1 comprises the following steps:

In Step (101) as shown in FIG. 2, the input image 20 (including an image of a lying tiger) is adjusted to a predetermined size, and a Gaussian pyramid is adopted for performing a linear filtering to a resized image 21.

Step (102) uses a down sampling method to obtain a plurality of levels of pyramid representations, and a Gaussian pyramid uses a weighted average to obtain an effect of a low pass filter, and this embodiment adopts a 5×5 convolution kernel to perform a filter, and the convolution kernel adopts a typical Gaussian kernel W:

$$W = \left[\frac{1}{256}, \frac{1}{64}, \frac{3}{128}, \frac{1}{64}, \frac{1}{256}; \frac{1}{64}, \frac{1}{16}, \frac{3}{32}, \frac{1}{16}, \frac{1}{64}; \frac{3}{128}, \frac{3}{32},\right.$$
$$\left.\frac{9}{64}, \frac{3}{32}, \frac{3}{128}; \frac{1}{64}, \frac{1}{16}, \frac{3}{32}, \frac{1}{16}, \frac{1}{64}; \frac{1}{256}, \frac{1}{64}, \frac{3}{128}, \frac{1}{64}, \frac{1}{256}\right]$$

to form 5 levels of pyramid images for each feature (including the intensity, color or orientation feature), but the present invention is not limited to such arrangement, and any number of pyramid images for each feature can be added or subtracted to achieve the effect of automatically detecting and tracking the feature points.

Step (103): Since each level of pyramid representations are images of an input image at different resolutions, therefore it is necessary to calculate the features for each level of pyramid representations when calculating each feature. The present invention adopts the operation of a linear center-surround operator similar to a biological perception, and the operating principle bases on the typical visual nerves being most sensitive to a small central region, and having a weak response to the region away from the small central region, and thus suppressing the response to the stimulation. If five levels of Gaussian pyramids (sequentially numbered as 0, 1, 2, 3, 4 from the bottom to the top) are adopted by the preferred embodiment to set $c \in \{0,1,2\}$, $s=c+\delta, \delta \in \{1,2\}$, and calculate 6 feature maps for each feature, wherein c is a level number of the large image in the pyramids, s is a level number of the small image in the pyramids, $\delta$ is the difference of levels between s and c in the pyramids, and the selection of s, c and $\delta$ is not unique, but it can be selected after going through a small sampling test and taking the operation efficiency into consideration. For the intensity feature, the intensity feature map can be calculated according to the following formula:

$$I(c,s)=|I(c)\ominus I(s)| \quad (1\text{-}7)$$

Figure 3:
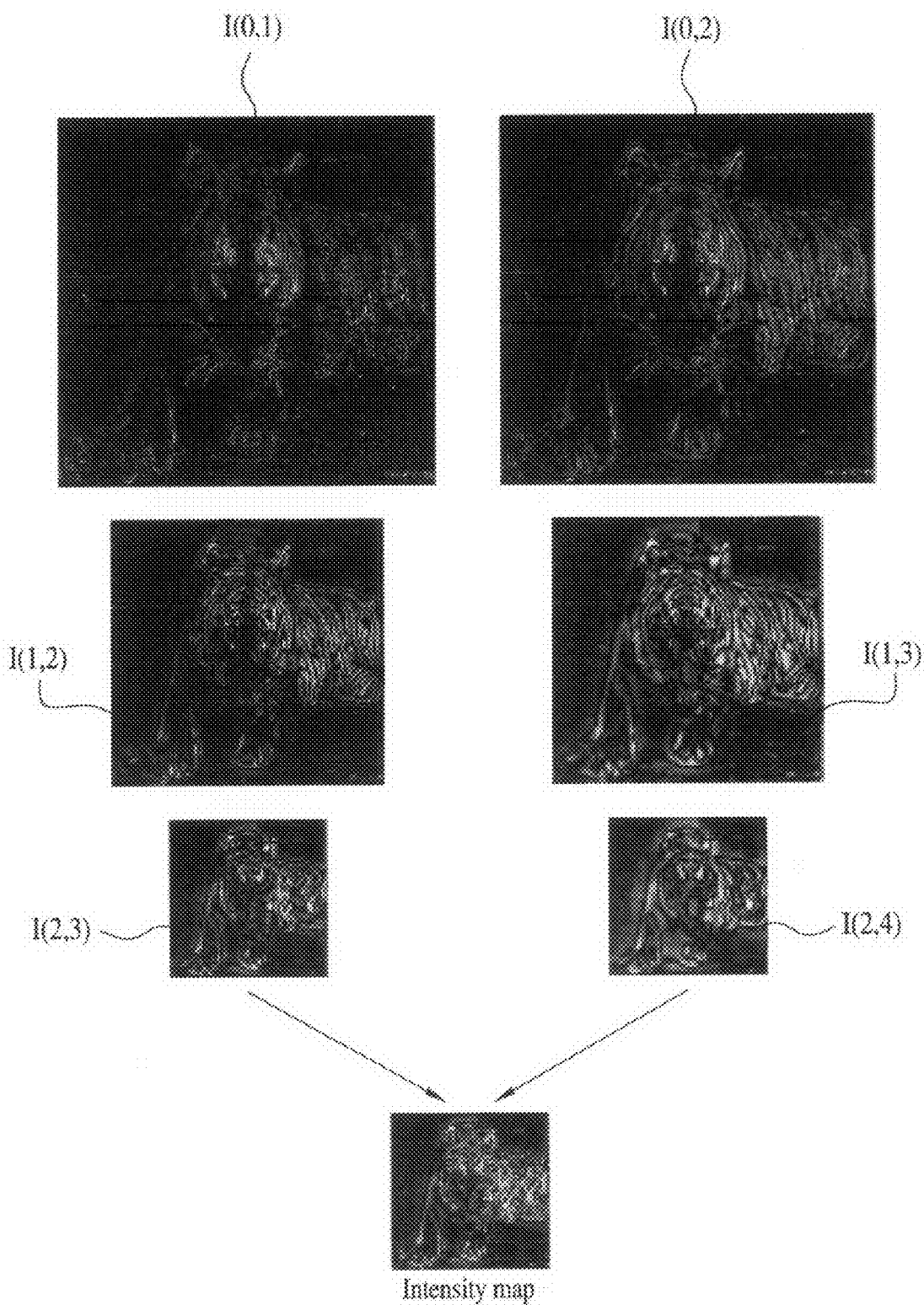
FIG. 3 is a schematic view of six intensity feature maps.

Where, "$\ominus$" is a subtraction operator for sampling a small image to the same size of a large image through an interpolation algorithm by using an up sampling method, and then a point-to-point subtraction is performed to obtain six intensity feature maps including I(0,1), I(0,2), I(1,2), I(1,3), I(2,3) and I(2,4) as shown in FIG. 3.

The color feature map is used for calculating to obtain color components of four channels R, G, B, Y, and then the color contrast feature is calculated according to the following formulas to obtain 12 color feature maps:

$$RG(c,s)=|(R(c)-G(c))\ominus(G(s)-R(s))| \quad (1\text{-}8)$$

$$BY(c,s)=|(B(c)-Y(c))\ominus(Y(s)-B(s))| \quad (1\text{-}9)$$

Figure 4:
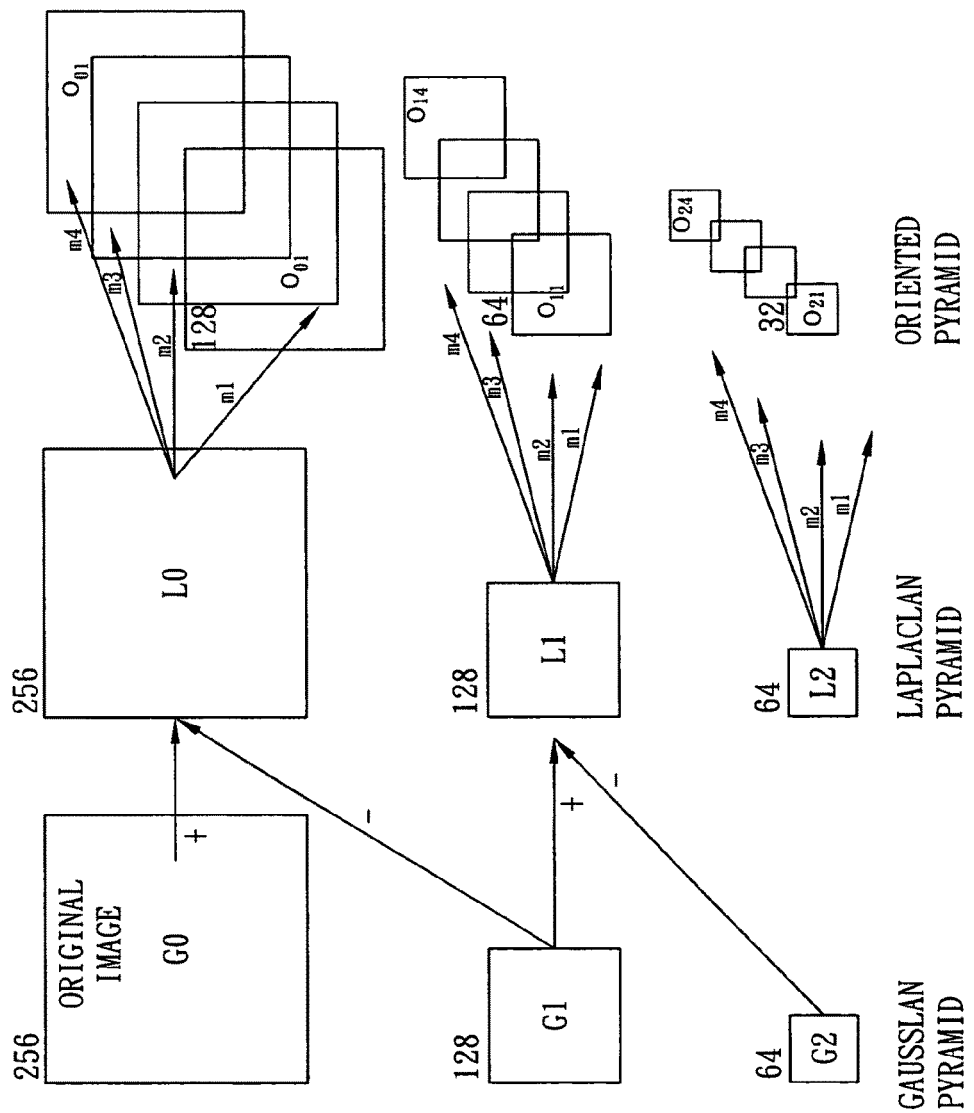
FIG. 4 is a schematic view of a feature map of an input image at four directions of 0°, 45°, 90° and 135°.

The orientation feature map is used for calculating the features of an image at four directions 0°, 45°, 90°, 135°, and its method is shown in FIG. 4. In the process for the present invention to decompose an image into a series of pyramid images, Gaussian pyramid and Laplacian pyramid computations are adopted for performing a low pass filter and a band pass filter for the image, wherein the Gaussian pyramid performs a low pass filter for the input image G0 (256*256 pixels), and adopts a down sampling method to obtain a series of images (G0, G1 and G2), and the Laplacian pyramid is subtracted from two adjacent Gaussian pyramid images (such as G0 and G1, and G1 and G2) to perform a band pass filter for the input image to obtain a series of images (L0, L1 and L2). In the following preferred embodiment, G0 stands for an input image (or intensity image), G1, G2, . . . , GN for corresponding images filtered by the low pass filter, and L0, L1, . . . , LN for images filtered by the band pass filter. The foregoing definitions are used to obtain a formula for calculating the low pass filter and band pass filter:

$$G_{n+1}{}^0=W^*G_n, L_n=G_n-G_{n+1}{}^0, G_{n+1}=\text{Subsampled } G_{n+1}{}^0 \quad (1\text{-}10)$$

where, W is a 5*5 filter, W=x'*x, x=[1/16 1/4 3/8 1/4 1/16], and the structure of W is given below:

$$W = \left[\frac{1}{256}, \frac{1}{64}, \frac{3}{128}, \frac{1}{64}, \frac{1}{256}; \frac{1}{64}, \frac{1}{16}, \frac{3}{32}, \frac{1}{16}, \frac{1}{64}; \frac{3}{128}, \frac{3}{32},\right.$$
$$\left.\frac{9}{64}, \frac{3}{32}, \frac{3}{128}; \frac{1}{64}, \frac{1}{16}, \frac{3}{32}, \frac{1}{16}, \frac{1}{64}; \frac{1}{256}, \frac{1}{64}, \frac{3}{128}, \frac{1}{64}, \frac{1}{256}\right]$$

In this embodiment, a direction kernel of four directions of an orientation feature of an image is calculated according to the following formulas:

$$m1(x,y)=e^{i(\pi/2)x}; m2(x,y)=e^{i(\pi\sqrt{2}/4)(x+y)};$$

$$m3(x,y)=e^{i(\pi/2)y}; m4(x,y)=e^{i(\pi\sqrt{2}/4)(y-x)} \quad (1\text{-}11)$$

Figure 5:
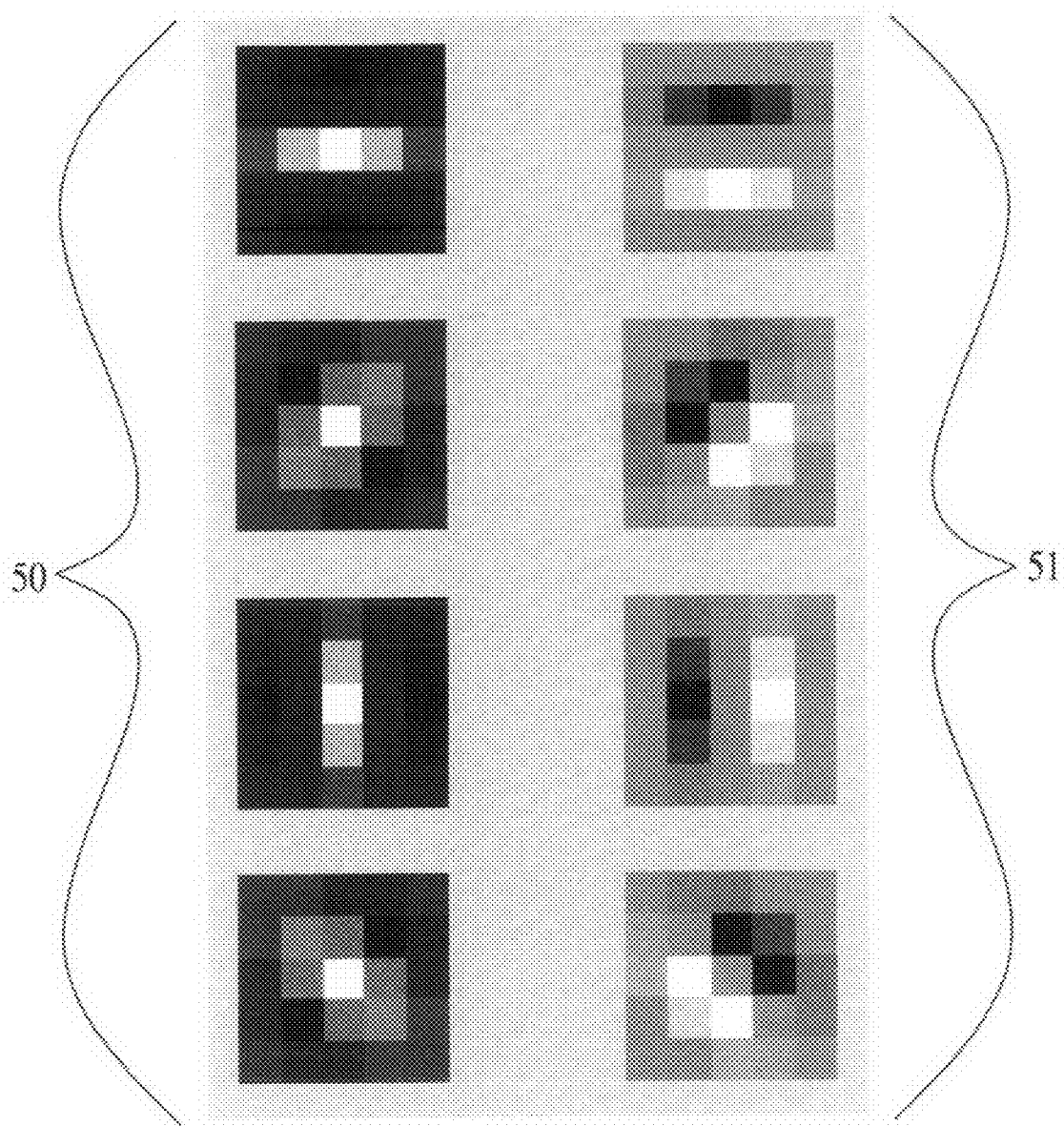
FIG. 5 is a schematic view of a filter kernel of a Gabor direction filter.

The two-dimensional Gabor function is a sine wave processed by a Gaussian low pass filter, and thus the foregoing Gaussian kernel is used for obtaining the Gabor direction filter of an orientation feature as follows:

$$\varphi_k(x,y) = \frac{1}{2\pi}e^{-(x^2+y^2)/2} \times m_k(x,y); k=1,2,3,4 \quad (1\text{-}12)$$

where, x stands for the multiplication of corresponding points. Therefore, the filter kernel of the four Gabor direction filters can be obtained as shown in FIG. 5, wherein the left column 50 is a real part, and the right column 51 is an imaginary part. After the four Gabor direction filters are obtained, the formula (1-10) is used to obtain a series of pyramid images Li by the Laplacian band pass filter for the processing, so as to obtain the feature maps of the four directions of each pyramid image. Then, the feature maps of the four directions are used for the subtraction of different levels of pyramids according to the following formula:

$$O(c,s)=|O(c,\theta)\ominus O(s,\theta)| \quad (1\text{-}13),$$

and 24 orientation feature maps are obtained as shown in FIG. 4 (after being filtered by the foregoing real portion of the filter kernel 50 and the imaginary part of the filter kernel 51).

In Step (105), this step uses an integral image to expedite the calculation of a mean value of a peripheral region, and uses the difference of the feature between a small central region and the peripheral region as a measured value of the feature of the resolution.

In Step (106), this step performs an overlay for the pyramid feature map of each feature to obtain a conspicuity map of each feature by a down sampling method. In this embodiment, the pyramid feature map of each feature at a different resolution is down sampled to the fourth level, and the point to point addition "$\oplus$" is performed to obtain the following three conspicuity maps $\overline{I}$, $\overline{C}$ and $\overline{O}$ of the corresponding features:

$$\overline{I} = \bigoplus_{c=0}^{2} \bigoplus_{s=c+1}^{c+2} N(I(c,s))$$

$$\overline{C} = \bigoplus_{c=0}^{2} \bigoplus_{s=c+1}^{c+2} [N(RG(c,s)) + N(BY(c,s))]$$

-continued $$\overline{O} = \sum_{\theta \in \{0°, 45°, 90°, 135°\}} N\left(\bigoplus_{c=0}^{2} \bigoplus_{s=c+1}^{c+2} N(O(c, s, \theta))\right)$$

which are the corresponding conspicuity maps 221, 222, 223 of each feature (intensity, color and orientation feature) as shown in FIG. 2.

In Step (107), this step performs an unification for the conspicuity maps 221, 222, 223 of the three features and uses a linear combination to obtain a saliency map 23 of the frames as shown in FIG. 2, and its method maps corresponding numeric regions in the conspicuity maps 221, 222, 223 of each feature onto [0, 255] to obtain $\bar{I}$, $\bar{C}$ and $\bar{O}$, and combines the conspicuity maps of the three features. In other words, $\bar{I}$, $\bar{C}$ and $\bar{O}$ are combined. In the meantime, the mean values mI, mC and mO of $\bar{I}$, $\bar{C}$ and $\bar{O}$ are used for obtaining the following saliency map of the frames:

$$S = \frac{\left(\frac{1}{mI}N(\bar{I}) + \frac{1}{mC}N(\bar{C}) + \frac{1}{mO}N(\bar{O})\right)}{\frac{1}{mI} + \frac{1}{mC} + \frac{1}{mO}}$$

In Step (108), this step performs an image segmentation for the conspicuity map 23 of a frame as shown in FIG. 2 to obtain a segmented image 24, and marks the large region with a mean value of the segmented image 24 as an interesting region 25 of the image (which is the white profile of a lying tiger) for performing a tracking of interesting regions in successive frames in a later process.

Figure 6:
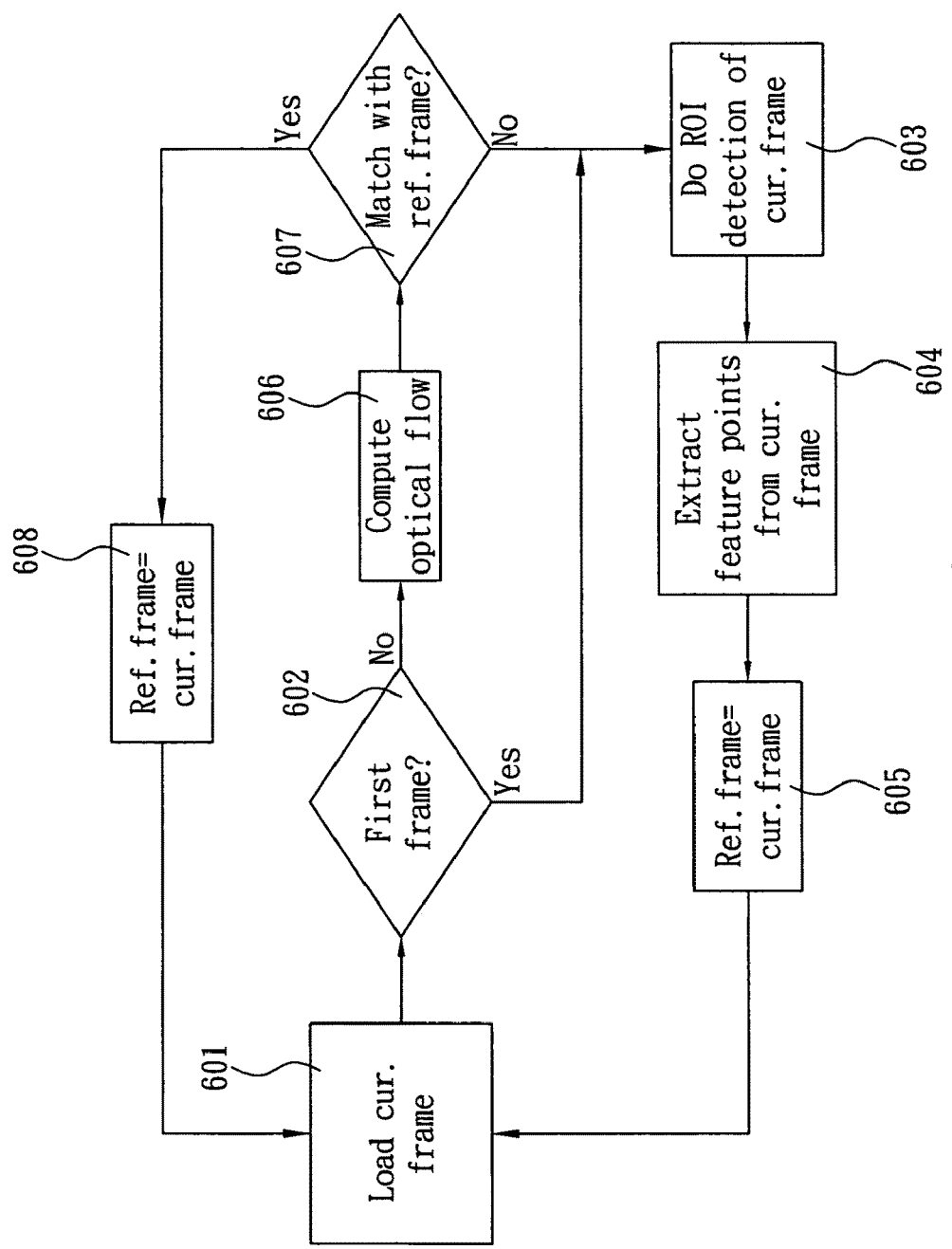
FIG. 6 is a flow chart of automatically detecting and tracking successive frames in a region of interesting by an electronic imaging device applied in the present invention.
Figure 7:
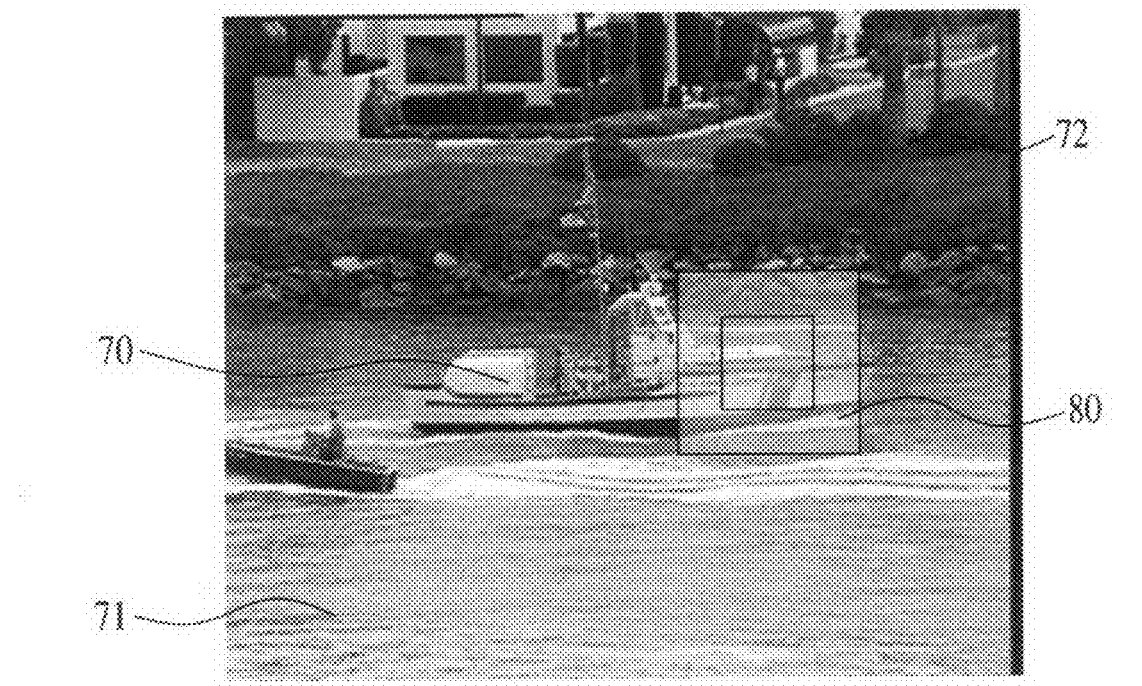
FIG. 7 is a first schematic view of an experiment in accordance with the present invention.
Figure 8:
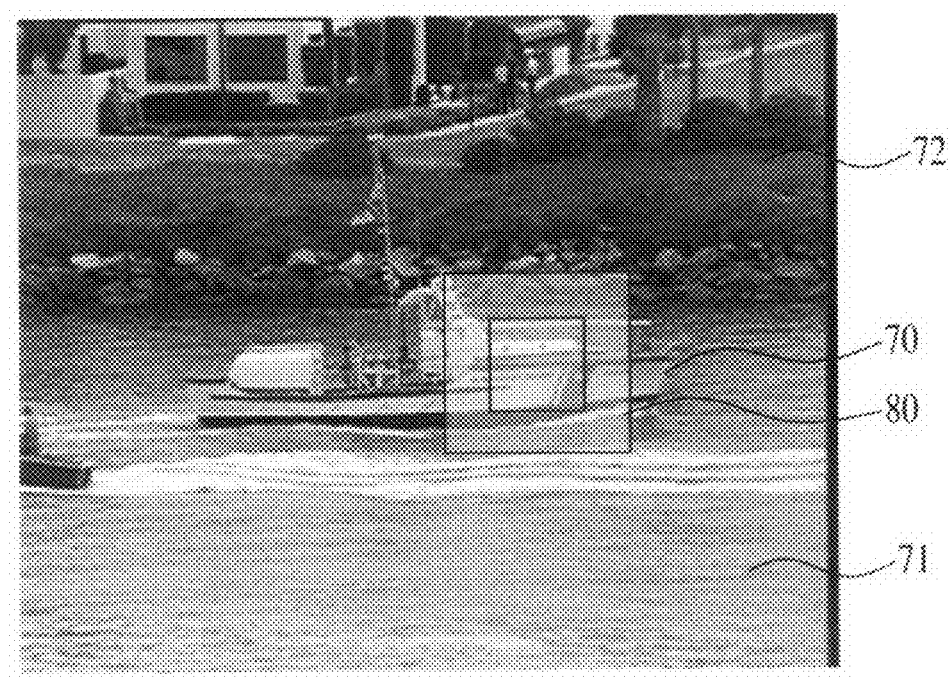
FIG. 8 is a second schematic view of an experiment in accordance with the present invention.
Figure 9:
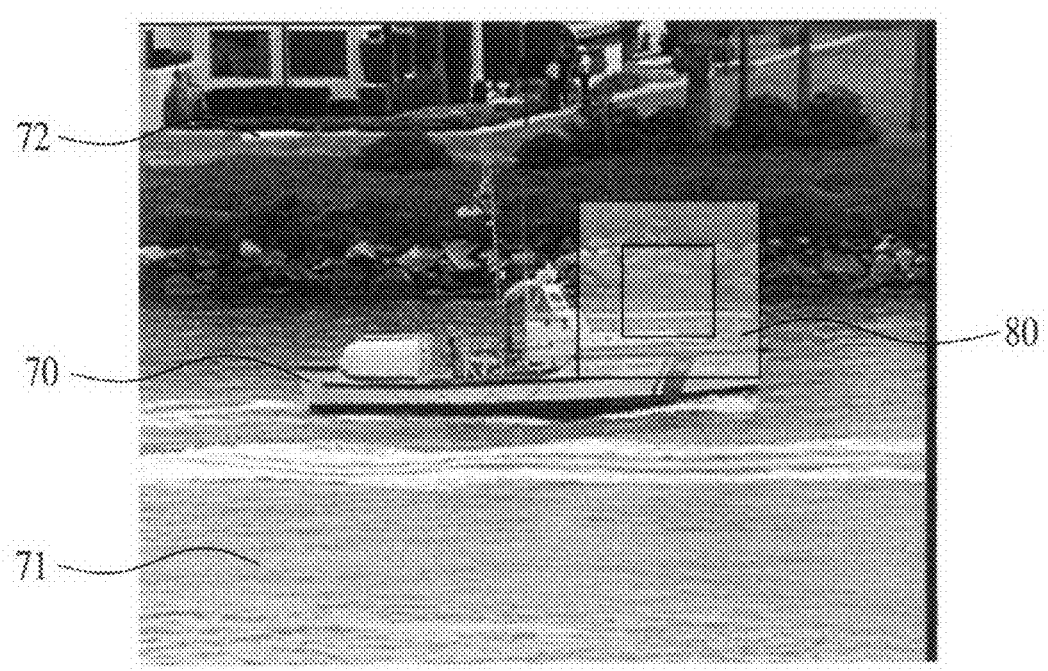
FIG. 9 is a third schematic view of an experiment in accordance with the present invention.
Figure 10:
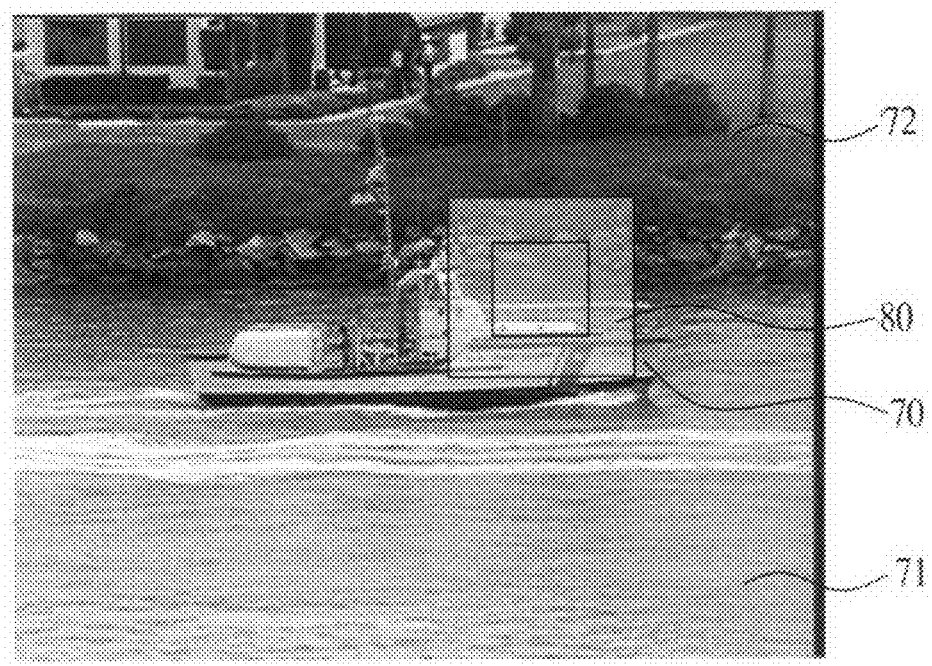
FIG. 10 is a fourth schematic view of an experiment in accordance with the present invention.

The method of the present invention is applied in an electronic imaging device for automatically detecting and tracking regions of interesting in the captured successive frames, and a first frame and a coming second frame captured by the electronic imaging device as shown in FIG. 6 are taken as examples for describing the method in details as follows:

In Step (601), the electronic imaging device captures a frame.

In Step (602), this step determines whether or not the frame is a first frame (which means to determine if a reference frame does not exist); if yes, go to Step (603), or else it is determined as the second frame, and go to Step (606);

In Step (603), this step marks the first frame as a current frame, and transmitting the current frame to a region of interesting detection (ROID) module, and the ROID module detects the interesting region in the current frame according to Steps (101) to (108) to obtain the interesting region of the current frame;

In Step (604), this step obtains a plurality of feature points (such as 10 feature points in this embodiment) for an interesting region in the current frame, and then marks the feature points as $(u_x(0), u_y(0))$, ... and $(u_x(9), u_y(9))$. In this embodiment of the present invention, the method for obtaining the feature points comprises the steps of:

(a) calculating the gradient $I_x(x,y)$ and $I_y(x,y)$ for each point $u(x,y)$ of an image I;

(b) calculating the corresponding matrix of each point $u(x,y)$ by $$G(u) = \sum_{x=p_x-\omega_x}^{p_x+\omega_x} \sum_{y=p_y-\omega_y}^{p_y+\omega_y} \begin{bmatrix} I_x^2(x, y) & I_x(x, y)I_y(x, y) \\ I_x(x, y)I_y(x, y) & I_y^2(x, y) \end{bmatrix},$$

and G(u) has a feature value $\lambda_u$, where $\omega_x$, $\omega_y$ stands for the parameters selected and set according to past experience;

(c) calculating the maximum value $\lambda_{max}$ for all $\lambda_u$, and maintaining the point $u(x,y)$ that satisfies the condition of $\lambda_u > \eta \lambda_{max}$ as a candidate feature point, where, $\eta = 0.9 \sim 0.95$; and (d) selecting the candidate feature point, such that the distance of any two selected candidate feature points is not less than D, and D=5~10.

In Step (605), this step marks the current frame as a reference frame, and then returns to Step (601) to continue capturing a next frame (which is a second frame).

In Step (606), this step marks the second frame as a current frame, and obtains a feature point according to the foregoing reference frame, and uses the Gaussian pyramid computation to calculate an optical flow value at a corresponding region in the current frame, and compare the reference frame and current frame, so as to find out the feature points corresponding to the feature points $(u_x(0), u_y(0))$, ... and $(u_x(9), u_y(9))$ from the current frame. The objective of the invention is to find out the corresponding feature points $(v_x(0), v_y(0))$, ... and $(v_x(9), v_y(9))$ from the current frame J according to the feature point $(u_x(0), u_y(0))$, ... and $(u_x(9) u_y(9))$ in the reference frame I. The method adopts a Gaussian pyramid model to establish a plurality of levels of pyramid representations in the reference frame I and the current frame J by a down sampling method, and each level of pyramid representations $I^L$ or $J^L$ s an image of the input image at a different resolution, wherein the reference frame $I^L$ establishes its pyramid representations according to the following formula:

$$I^L(x, y) = \frac{1}{4}I^{L-1}(2x, 2y) + \frac{1}{8}(I^{L-1}(2x-1, 2y) + I^{L-1}(2x+1, 2y) + I^{L-1}(2x, 2y-1) + I^{L-1}(2x, 2y)+1)) + \frac{1}{16}(I^{L-1}(2x-1, 2y-1) + I^{L-1}(2x+1, 2y+1) + I^{L-1}(2x-1, 2y+1) + I^{L-1}(2x+1, 2y+1))$$

where, L stands for a level with a value ranging from 1 to M, and x and y for coordinates of a pixel of an image at a different resolution. Similarly, the foregoing formula can be used for establishing a pyramid representation of the current frame J. Then, a down sampling method is used for a pyramidal guess from Level M downward to Level 0 to perform the following initialization:

$$d^L = [d_x^L, d_y^L] = [0,0]$$

where, $d = [d_x, d_y]$ stands for a displacement of the feature points $(u_x(0) u_y(0))$, ... and $(u_x(9) u_y(9))$ on the reference frame I corresponding to the feature points $(v_x(0), v_y(0))$, ... and $(v_x(9), v_y(9))$ on the current frame J to obtain the position $u^L$ on each level L of the feature points $(u_x(0), u_y(0))$, ... and $(u_x(9) u_y(9))$ in the reference frame I:

$$u^L = \frac{u}{2^L}.$$

In the image $J^L$ of each level of the current frame J in accordance with the present invention, the position $u^L$ of each corresponding level of the feature point $(u_x(0), u_y(0))$, ... and $(u_x(9), u_y(9))$ of the reference frame I is used as the center for calculating an estimated position $v^L$ of each corresponding level of the feature point $(v_x(0), v_y(0))$, ... and $(v_x(9) v_y(9))$ of the current frame J within a specific range:

$$v_L = (u_x + d_x, u_y + d_y)$$

and calculate its error according to the following error function:

$$\epsilon(d) = \epsilon(d_x, d_y) = \sum_{x=u_x-\omega_x}^{u_x+\omega_x} \sum_{y=u_y-\omega_y}^{u_y+\omega_y} (I(x, y) - J(x + d_x, y + d_y))^2.$$

Where, $d=[d_x, d_y]$ stands for a displacement of the feature points $(u_x(0), u_y(0))$, ... and $(u_x(9), u_y(9))$ of the reference frame I corresponding to the feature points $(v_x(0), v_y(0))$, ... and $(v_x(9), v_y(9))$ of the current frame J, $\omega_x$, $\omega_y$ for setting parameters selected and set according to past experience. In the computation of the invention, the error value $\epsilon(d)$ is used for correcting the displacement $d=[d_x, d_y]$ until the error value $\epsilon(d)$ is determined to be smaller than a predetermined threshold, and then the estimated position $v^L$ is determined to be a position of each corresponding level of the feature points $(v_x(0), v_y(0))$, ... and $(v_x(9), v_y(9))$ of the current frame J. On the other hand, if all of the estimated positions $v^L$ are searched and found that they cannot meet the requirement of having the foregoing error value $\epsilon(d)$ less than the predetermined threshold, then the tracking of the feature point will be considered and marked as failed.

The pyramidal guess d for the next level $d^{L-1}$ is calculated as follows:

$$d^{L-1} = 2d^L = 2*[d_x^L, d_y^L]$$

and the aforementioned procedure is repeated to find out the position of a corresponding level L−1 of the feature point $(v_x(0), v_y(0))$, ... and $(v_x(9)v_y(9))$ of the current frame J. On the other hand, if all estimated positions $v^{L-1}$ are searched and found that they cannot meet the requirement of having the error value $\epsilon(d)$ less than the predetermined threshold, then the tracking of the feature point is considered and marked as failed, and so on. The aforementioned procedure is repeated to find out the position of each level M~0 of the feature points $(v_x(0), v_y(0))$, ... and $(v_x(9), v_y(9))$ of the current frame J.

It is noteworthy to point out that the present invention sets the condition of determining whether or not the tracking of the feature points is successful in advance according to actual needs. For example, a preferred embodiment of the invention sets the condition of considering the tracking as successful if 7 corresponding feature points of the current frame J corresponding to the feature points $(u_x(0), u_y(0))$, ... and $(u_x(9), u_y(9))$ of the reference frame I are found, and then the positions of the feature points $(v_x(0), v_y(0))$ ... of the current frame J are marked and the following correction is made:

u=v,

I=J, such that the feature points $(v_x(0), v_y(0))$, ... and $(v_x(9), v_y(9))$ of the current frame J replace the feature points $(u_x(0), u_y(0))$, ... and $(u_x(9), u_y(9))$ of the reference frame I, and the current frame J replaces the reference frame I; or else the tracking is considered as failed. The aforementioned procedure is performed, and a next frame is captured by the electronic imaging device for the calculation. However, the implementation of the present invention is not limited to such arrangement, but any addition or subtraction of the predetermined quantity of feature points or any addition or subtraction of the quantity of corresponding feature points for determining a success or a failure of the tracking can be made according to actual needs to achieve the effect of automatically detecting and tracking feature points, and it is intended to cover all of the above modification and similar arrangements into the scope of the appended claims.

In Step (607), this step determines whether or not the feature points corresponding to the feature points $(u_x(0), u_y(0))$, ... and $(u_x(9), u_y(9))$ exist in the current frame; if yes, go to Step (608), or else go to Step (603) to transmit the current frame to the region of interesting detection (ROID) module, and the ROID module detects an interesting region in the current frame to obtain the interesting region in the current frame.

In Step (608), this step marks the current frame as a reference frame, and returns to Step (601) to continue capturing a next frame.

If the present invention uses an electronic imaging device to perform an experiment for a model boat 70 traveling in a high speed in a creek 71 according to the foregoing method, the successive captured frames are captured as shown in FIGS. 7 to 10, and the present invention can quickly detect, track and mark the interesting region 80 (which is marked by a frame) with an environment of a very complicated background 72 (including the waves in the creek 71, rocks at the bank of the creek 71, grasses and trees, and houses and roads at a far end), and thus the invention has a high capability of distinguishing similar gray-scale distributions and overcoming the interference caused by the change of dimensions and rotation of the interesting region 80, and experiments show that the invention not only detects, positions and tracks the interesting regions 80 in successive frames and comes with a very high computing speed, but also greatly enhance the significance of the feature points and the effectiveness of similarity measurements, and thus the present invention has a very high robustness.

While the invention has been described by means of specific embodiments, numerous modifications and variations could be made thereto by those skilled in the art without departing from the scope and spirit of the invention set forth in the claims.

What is claimed is:

1. A method of automatically detecting and tracking successive frames in a region of interesting by an electronic imaging device, and the method being applied in an electronic imaging device, and the electronic imaging device installing a region of interesting detection (ROID) module, and the ROID module being provided for detecting an interesting region in successive frames to obtain the interesting region in each frame, and the method comprising:

decomposing an input image into three features corresponding to intensity, color and direction according to a human vision principle of perceptions of intensity, color and orientation;

adopting a Gaussian pyramid computation method to filter the input image and use a down sampling method to obtain a plurality of levels of pyramid representations, and each level of pyramid representations includes images of the input images at different resolutions;

calculating the features of each level of pyramid representations, using a linear center-surround operator similar to a biological perception for calculating each feature, using an integral image to expedite calculating a mean value of a peripheral region, and using a difference between a small central region and a peripheral region of each feature as a feature measured value of the resolution to calculate a corresponding pyramid feature map of each feature;

overlaying the corresponding pyramid feature map of each feature by a down sampling method to obtain a conspicuity map of each feature;

performing a unification to the conspicuity maps of the three features, and then obtaining a saliency map of the frames by a linear combination method;

performing a frame segmentation for the saliency of the frames, and marking the large region of the mean value of the conspicuity map as an interesting region of the input frame; and tracking a corresponding interesting region of later frames according to the interesting region of the input frame.

2. The method of claim 1, wherein the input image has an intensity feature I=(r+g+b)/3, wherein r, g, b stand for components of three color channels of the input frame respectively.

3. The method of claim 2, wherein the input frame includes color information of four channels R, G, B, Y of a color feature as follows:

$R=r-(g+b)/2;$ $G=g-(r+b)/2;$ $B=b-(r+g)/2;$ and $Y=(r+g)/2-|r-g|-b.$

4. The method of claim 3, wherein the input frame has an orientation feature that adopts a Gabor pyramid and uses a Gabor filter to perform a convolution filter of an intensity of an image in four directions (0°, 45°, 90°, 135°) to obtain the feature maps of the four directions.

5. The method of claim 4, wherein the orientation feature map uses Gaussian pyramid and Laplacian pyramid computations for the process of decomposing an image into a series of pyramid images to perform a low pass filter and a band pass filter for the image, and the Gaussian pyramid performs a low pass filter for the input image G0, and uses a down sampling method to obtain a series of images G1, G2, ..., GN, and the Laplacian pyramid subtracts two adjacent Gaussian pyramid images to perform a band pass filter for the input image to obtain a series of images L0, L1, ..., LN, and the formulas for calculating the low pass filter and the band pass filter are:

$G_{n+1}^0 = W*G_n$, $L_n = G_n - G_{n+1}^0$, $G_n$=Subsampled $G_{n+1}$, where W is a 5*5 filter, that is W=x'*x, x=[1/16 1/4 3/8 1/4 1/16] with a structure of:

$$W = \left[ \frac{1}{256}, \frac{1}{64}, \frac{3}{128}, \frac{1}{64}, \frac{1}{256}; \frac{1}{64}, \frac{1}{16}, \frac{3}{32}, \frac{1}{16}, \frac{1}{64}; \frac{3}{128}, \frac{3}{32}, \right.$$
$$\left. \frac{9}{64}, \frac{3}{32}, \frac{3}{128}; \frac{1}{64}, \frac{1}{16}, \frac{3}{32}, \frac{1}{16}, \frac{1}{64}; \frac{1}{256}, \frac{1}{64}, \frac{3}{128}, \frac{1}{64}, \frac{1}{256} \right],$$

and the direction kernels of the four directions of the image orientation feature are calculated according to the following formulas:

$m1(x,y)=e^{i(\pi/2)}x;$ $m2(x,y)=e^{i(\pi\sqrt{2}/4)(x+y)};$ $m3(x,y)=e^{i(\pi/2)y};$ $m4(x,y)=e^{i(\pi\sqrt{2}/4)(y-x)},$ and by the following Gabor direction filter:

$$\varphi_k(x,y) = \frac{1}{2\pi}e^{-(x^2+y^2)/2} \times m_k(x,y); k = 1, 2, 3, 4,$$

where, x refers to a multiplication of corresponding points for processing a series of pyramid images Li obtained by the Laplacian band pass filter to obtain an orientation feature and feature maps of four directions of each pyramid image; and then a subtraction is performed for the feature maps of the four directions in the levels of different pyramid maps according to the following formula:

$O(c,s)=|O(c,\theta)\ominus O(s,\theta)|,$ so as to obtain 24 orientation feature maps.

6. The method of claim 5, wherein the conspicuity map of each feature adopts a down sampling method to overlay and obtain the pyramid feature map calculated by each feature.

7. The method of claim 6, wherein the saliency map of the frames is calculated by mapping the values in regions of each feature corresponding to the conspicuity map to [0, 255] to obtain $\bar{I}$, $\bar{C}$ and $\bar{O}$, and combining the calculated conspicuity maps of the three features or combining $\bar{I}$, $\bar{C}$ and $\bar{O}$, while calculating means mI, mC and mO of $\bar{I}$, $\bar{C}$ and $\bar{O}$ to obtain the saliency map of frames as follows:

$$S = \frac{\left(\frac{1}{mI}N(\bar{I}) + \frac{1}{mC}N(\bar{C}) + \frac{1}{mO}N(\bar{O})\right)}{\frac{1}{mI} + \frac{1}{mC} + \frac{1}{mO}}.$$

8. The method of claim 7, further comprising:

capturing a frame;

marking the frame as a current frame;

determining whether or not a reference frame exists;

if the reference frame exists, obtaining a plurality of feature points from an interesting region of the reference frame;

calculating an optical flow value of a corresponding region of the current frame by a Gaussian pyramid computation according to the feature points obtained from the reference frame, and comparing the reference frame and the current frame to find out feature points corresponding to the feature points in the current frame;

determining whether or not the current frame includes corresponding feature points corresponding to the feature points; and marking the current frame as the reference frame, and returning to the aforementioned step to continue capturing a next frame.

9. The method of claim 7, further comprising:

capturing a frame;

marking the frame as a current frame;

determining whether or not a reference frame exists;

obtaining a plurality of feature points from an interesting region in the reference frame, if the reference frame exists;

calculating an optical flow value of a corresponding region of the current frame by a Gaussian pyramid computation according to the feature points obtained from the reference frame, and comparing the reference frame and the current frame to find out feature points corresponding to the feature points in the current frame;

determining whether or not the current frame includes feature points corresponding to the feature points;

transmitting the current frame to the region of interesting detection (ROID) module, if the current frame does not include the corresponding feature points, and the ROID module detecting an interesting region in the current frame to obtain the interesting region in the current frame;

obtaining a plurality of feature points from the interesting region in the current frame; and marking the current frame as the reference frame, and returning to the aforementioned step to continue capturing a frame.

10. The method of claim 7, wherein the method is applied in an electronic imaging device for automatically detecting and tracking a region of interesting in the captured successive frames, and the method further comprises:

capturing a frame;

marking the frame as a current frame;

determining whether or not a reference frame exists;

transmitting the current frame to the region of interesting detection (ROID) module, if the reference frame does not exist, and the ROID module detecting an interesting region in the current frame to obtain the interesting region in the current frame;

obtaining a plurality of feature points from the interesting region of the current frame; and marking the current frame as the reference frame, and returning to the aforementioned step to continue capturing a frame.

11. The method of claim 3, wherein the color feature maps are used for calculating color components of four channels R, G, B, Y according to the following formula, and then calculating color contrast features:

$$RG(c,s)=|(R(c)-G(c))\Theta(G(s)-R(s))| \text{ and}$$

$BY(c,s)=|(B(c)-Y(c))\Theta(Y(s)-B(s))|$ to obtain 12 related color feature maps.

12. The method of claim 11, wherein the conspicuity map of each feature adopts a down sampling method to overlay and obtain the pyramid feature map calculated by each feature.

13. The method of claim 12, wherein the saliency map of the frames is calculated by mapping the values in regions of each feature corresponding to the conspicuity map to [0, 255] to obtain $\bar{I}$, $\bar{C}$ and $\bar{O}$, and combining the calculated conspicuity maps of the three features or combining $\bar{I}$, $\bar{C}$ and $\bar{O}$, while calculating means mI, mC and mO of $\bar{I}$, $\bar{C}$ and $\bar{O}$ to obtain the saliency map of frames as follows:

$$S = \frac{\left(\frac{1}{mI}N(\bar{I})+\frac{1}{mC}N(\bar{C})+\frac{1}{mO}N(\bar{O})\right)}{\frac{1}{mI}+\frac{1}{mC}+\frac{1}{mO}}.$$

14. The method of claim 13, further comprising:

capturing a frame;

marking the frame as a current frame;

determining whether or not a reference frame exists;

if the reference frame exists, obtaining a plurality of feature points from an interesting region of the reference frame;

calculating an optical flow value of a corresponding region of the current frame by a Gaussian pyramid computation according to the feature points obtained from the reference frame, and comparing the reference frame and the current frame to find out feature points corresponding to the feature points in the current frame;

determining whether or not the current frame includes corresponding feature points corresponding to the feature points; and marking the current frame as the reference frame, and returning to the aforementioned step to continue capturing a next frame.

15. The method of claim 13, further comprising:

capturing a frame;

marking the frame as a current frame;

determining whether or not a reference frame exists;

obtaining a plurality of feature points from an interesting region in the reference frame, if the reference frame exists;

calculating an optical flow value of a corresponding region of the current frame by a Gaussian pyramid computation according to the feature points obtained from the reference frame, and comparing the reference frame and the current frame to find out feature points corresponding to the feature points in the current frame;

determining whether or not the current frame includes feature points corresponding to the feature points;

transmitting the current frame to the region of interesting detection (ROID) module, if the current frame does not include the corresponding feature points, and the ROID module detecting an interesting region in the current frame to obtain the interesting region in the current frame;

obtaining a plurality of feature points from the interesting region in the current frame; and marking the current frame as the reference frame, and returning to the aforementioned step to continue capturing a frame.

16. The method of claim 13, wherein the method is applied in an electronic imaging device for automatically detecting and tracking a region of interesting in the captured successive frames, and the method further comprises:

capturing a frame;

marking the frame as a current frame;

determining whether or not a reference frame exists;

transmitting the current frame to the region of interesting detection (ROID) module, if the reference frame does not exist, and the ROID module detecting an interesting region in the current frame to obtain the interesting region in the current frame;

obtaining a plurality of feature points from the interesting region of the current frame; and marking the current frame as the reference frame, and returning to the aforementioned step to continue capturing a frame.

17. The method of claim 2, wherein the intensity feature map is calculated according to the following formula:

$$I(c,s)=|I(c)\Theta I(s)|$$

where, c is a level number of a large image in a pyramid, s is a level number of a small image in the pyramid, and "$\Theta$" is a subtraction operator for sampling a small image to the same size of a large image through an interpolation algorithm by using an up sampling method, and a point-to-point subtraction is performed to obtain six intensity feature maps.

18. The method of claim 17, wherein the conspicuity map of each feature adopts a down sampling method to overlay and obtain the pyramid feature map calculated by each feature.

19. The method of claim 18, wherein the saliency map of the frames is calculated by mapping the values in regions of each feature corresponding to the conspicuity map to [0, 255] to obtain $\bar{I}$, $\bar{C}$ and $\bar{O}$ and combining the calculated conspicuity maps of the three features or combining $\bar{I}$, $\bar{C}$ and $\bar{O}$, while calculating means mI, mC and mO of $\bar{I}$, $\bar{C}$ and $\bar{O}$ to obtain the saliency map of frames as follows:

$$S = \frac{\left(\frac{1}{mI}N(\bar{I})+\frac{1}{mC}N(\bar{C})+\frac{1}{mO}N(\bar{O})\right)}{\frac{1}{mI}+\frac{1}{mC}+\frac{1}{mO}}.$$

20. The method of claim 19, further comprising:

capturing a frame;

marking the frame as a current frame;

determining whether or not a reference frame exists;

if the reference frame exists, obtaining a plurality of feature points from an interesting region of the reference frame;

calculating an optical flow value of a corresponding region of the current frame by a Gaussian pyramid computation according to the feature points obtained from the reference frame, and comparing the reference frame and the current frame to find out feature points corresponding to the feature points in the current frame;

determining whether or not the current frame includes corresponding feature points corresponding to the feature points; and marking the current frame as the reference frame, and returning to the aforementioned step to continue capturing a next frame.

21. The method of claim 19, further comprising:

capturing a frame;

marking the frame as a current frame;

determining whether or not a reference frame exists;

obtaining a plurality of feature points from an interesting region in the reference frame, if the reference frame exists;

calculating an optical flow value of a corresponding region of the current frame by a Gaussian pyramid computation according to the feature points obtained from the reference frame, and comparing the reference frame and the current frame to find out feature points corresponding to the feature points in the current frame;

determining whether or not the current frame includes feature points corresponding to the feature points;

transmitting the current frame to the region of interesting detection (ROID) module, if the current frame does not include the corresponding feature points, and the ROID module detecting an interesting region in the current frame to obtain the interesting region in the current frame;

obtaining a plurality of feature points from the interesting region in the current frame; and marking the current frame as the reference frame, and returning to the aforementioned step to continue capturing a frame.

22. The method of claim 19, wherein the method is applied in an electronic imaging device for automatically detecting and tracking a region of interesting in the captured successive frames, and the method further comprises:

capturing a frame;

marking the frame as a current frame;

determining whether or not a reference frame exists;

transmitting the current frame to the region of interesting detection (ROID) module, if the reference frame does not exist, and the ROID module detecting an interesting region in the current frame to obtain the interesting region in the current frame;

obtaining a plurality of feature points from the interesting region of the current frame; and marking the current frame as the reference frame, and returning to the aforementioned step to continue capturing a frame.

* * * * *